(12) United States Patent
Peterka et al.

(10) Patent No.: US 9,516,364 B2
(45) Date of Patent: Dec. 6, 2016

(54) SECURE TRANSCODING OF CONTENT (75) Inventors: Petr Peterka, San Diego, CA (US); Gerald R. Johnson, Cataumet, MA (US); Geetha Mangalore, San Diego, CA (US); Rafie Shamsaasef, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1904 days.

(21) Appl. No.: 12/749,130

(22) Filed: Mar. 29, 2010

(65) Prior Publication Data

US 2011/0235801 A1    Sep. 29, 2011

(51) Int. Cl.
*H04L 9/00* (2006.01)
*H04N 21/254* (2011.01)
*H04N 21/2343* (2011.01)
*H04N 21/2347* (2011.01)
*H04L 9/08* (2006.01)

(52) U.S. Cl.
CPC ........ *H04N 21/2541* (2013.01); *H04L 9/0819* (2013.01); *H04N 21/2343* (2013.01); *H04N 21/2347* (2013.01); *H04L 2209/603* (2013.01)

(58) Field of Classification Search
None
See application file for complete search history.

(56) References Cited

U.S. PATENT DOCUMENTS

| 7,376,623 | B2* | 5/2008 | Dutta et al. | 705/52 |
| 7,681,035 | B1* | 3/2010 | Ayars et al. | 713/165 |
| 2002/0186844 | A1* | 12/2002 | Levy et al. | 380/231 |
| 2003/0200459 | A1* | 10/2003 | Seeman | 713/200 |
| 2005/0132208 | A1* | 6/2005 | Hug et al. | 713/189 |
| 2009/0296940 | A1* | 12/2009 | Moroney et al. | 380/278 |

* cited by examiner

*Primary Examiner* — Christopher Revak
(74) *Attorney, Agent, or Firm* — Fox Rothschild LLP (57) ABSTRACT A source device determines content rights for encrypted content in the first encoding standard using a first rights data file. The source device creates a second rights data file for transcoded content in the second encoding standard. The source device performs a key management operation including communicating a decryption key for the encrypted content in the first encoding standard to a transcoder. The source device transfers the encrypted content in the first encoding standard to the transcoder. The transcoder decrypts the encrypted content, transcodes the content from the first encoding standard to the content in the second encoding standard, and re-encrypts the content in the second encoding standard using a second encryption key. The transcoder then transfers the encrypted content in the second encoding standard to an indicated device.

23 Claims, 5 Drawing Sheets

SECURE TRANSCODING OF CONTENT

BACKGROUND

There has been substantial growth in the use of set-top boxes (STBs) equipped with digital video recording capabilities. Users often record content, such as, television programs, onto the digital video recorder (DVR). The users are then able to view the recorded content at a later time on a television to which the DVR is connected. Oftentimes, however, users would like to copy the recorded content onto a portable multimedia device (PMD) or a portable media player (PMP), such as, a laptop computer, a personal digital assistant (PDA), and a cellular telephone.

Directly copying of the content recorded on the DVR onto the PMDs is often limited by a number of factors. One of these factors is that the format in which the content is recorded onto the DVR is typically incompatible with the playback formats of the PMD and thus, even if the PMD is able to store the content recorded on the DVR, the PMD is typically incapable of playing the content. Another factor is that the PMDs are often equipped with a different digital rights management (DRM) system than the DRM system that manages digital rights of media content stored and played on the DVR. The DRM systems typically prevent unauthorized copying of content onto and playback of the content on the PMDs. Due to the different DRM system on the PMD, even if the content were copied to the PMD in a format compatible with the PMD, the content would still not be playable because the DRM system of the PMD would not be able to determine whether the PMD has rights to play the content.

SUMMARY

Disclosed herein is a source device having encrypted content in a first encoding standard, according to an embodiment. The source device includes a data storage and a processor. The data storage stores a first rights data file that includes a first content ID, a first encryption key seed, and indicates content rights including whether transcoding of the encrypted content in the first encoding standard to encrypted content in the second encoding standard is allowed. The processor determines the content rights for the encrypted content in the first encoding standard using the first rights data file and creates a second rights data file for transcoded content in the second encoding standard. The second rights data file includes a second content ID, a second encryption key seed and a set of second content rights associated to the second content. The source device performs a key management operation including communicating a decryption key seed for the encrypted content in the first encoding standard and the content rights and the second encryption key seed for the encrypted content in the second encoding standard and the second content rights to the transcoder. The source device transfers the encrypted content in the first encoding standard to the transcoder. The transcoder decrypts the encrypted content in the first encoding standard using the decryption key, transcodes the content in the first encoding standard to the content in the second encoding standard, and re-encrypts the content in the second encoding standard to form encrypted content in the second encoding standard using the second encryption key. The transcoder then transfers the encrypted content in the second encoding standard to an indicated device.

Also disclosed herein is a method of securely transcoding content from a first encoding standard to a second encoding standard, according to an embodiment. In the method, content rights for encrypted content in a first encoding standard are determined using a first rights data file. The first rights data file includes a first content ID and indicates whether the content rights including transcoding of the encrypted content in the first encoding standard to encrypted content in the second encoding standard is allowed. A second rights data file for transcoded content in the second encoding standard is created. The second rights data file includes a second content ID, and a second encryption key seed that is used to derive the second encryption key. The second encoding content format type is also used in deriving the second encryption key. A transcoder is then authenticated. A key management operation that includes communicating a decryption key seed and content rights for the encrypted content in the first encoding standard and a second encryption key seed and second content rights for the encrypted content in the second encoding standard to the transcoder is performed. The encrypted content in the first encoding standard is transferred to the transcoder. The transcoder is configured to decrypt the encrypted content in the first encoding standard using the decryption key, transcode the content in the first encoding standard to the content in the second encoding standard, and re-encrypt the content in the second encoding standard to form encrypted content in the second encoding standard using the second encryption key. The encrypted content in the second encoding standard is transferred to an indicated device.

Still further disclosed is a computer readable storage medium on which is embedded one or more computer programs implementing the above-disclosed method of securely transcoding content from a first encoding standard to a second encoding standard, according to an embodiment.

Embodiments of the present invention provide a way of securely transcoding content in one encoding standard to another encoding standard. The embodiments of the invention also provide a secure process of communicating digital right management information between a source device and a transcoder.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention. Also, different embodiments may be used in combination with each other.

Figure 1:
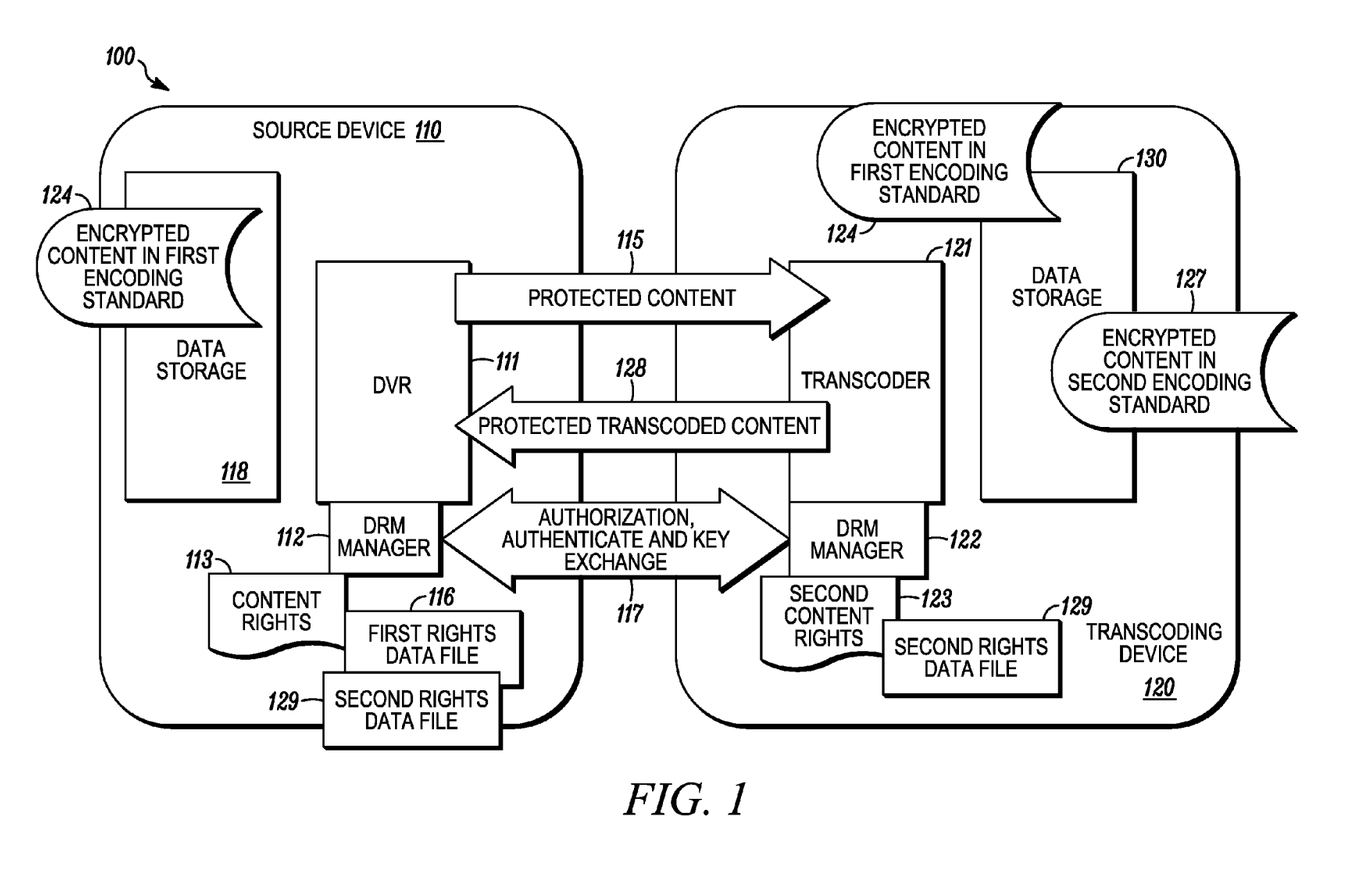
FIG. 1 illustrates a data flow diagram for securely transcoding content from a first encoding standard to a second encoding standard, according to an embodiment.

FIG. 1 illustrates a data flow diagram in a system 100 for securely transcoding content from a first encoding standard to a second encoding standard, according to an embodiment. The system 100 includes a source device 110 and a transcoding device 120. The source device 110 is configured to store encrypted content 124 which is encoded in a first encoding standard in a data storage 118, which includes a data storage device. The data storage may include a DVR 111 or another type of data storage device. The encrypted content 124 is transferred to the transcoding device 120 and is transcoded into a second encoding format, shown as 127. The first encoding standard and the second encoding standard comprise different standards for audio and/or video compression and format. For instance, the first encoding standard may comprise MPEG-2 and the second encoding standard may comprise MPEG-4. Other conventional standards may be used. It should be understood that the following description of the system 100 is but one manner of a variety of different manners in which such a system 100 may be configured and operated. In addition, it should be understood that the system 100 may include additional components and that some of the components described may be removed and/or modified without departing from a scope of the system 100.

As shown in FIG. 1, the source device 110 comprises a device configured to store or receive content in the first encoding standard. For instance, the source device 110 may include the DVR 111, which is also often referred to as a personal video recorder (PVR). The source device 110 may be configured to operate as a set-top box (STB) and is thus operable to be connected to a content provider, such as, a cable service provider, a satellite service provider, IPTV provider, etc., through a communications network (not shown). The communications network may include, for instance, a broadband connection to the content provider, such as, over optical fiber, hybrid fiber coaxial cable network, satellite signals, terrestrial signals, wireless, etc. The communications network may also include a cable modem, an integrated services digital network modem, a digital subscriber line modem, etc., that enables the source device 110 to communicate to the content provider over the communications network.

In any regard, the source device 110 is configured to store the encrypted content in the first encoding standard 124, which may be received from a content provider. The encrypted content 124 may comprise media content, such as, network television programs, pay-per-view movies, pay-per-view events, video on demand, video file downloads, audio files, etc., from the content provider through the communications network. The encrypted content 124 is protected using a DRM system to form protected content 115. More particularly, the source device 110 includes a DRM manager 112 configured to provide DRM protection for the content. For example, the DRM manager 112 may comprise a copy control information (CCI) manager configured to enforce content rights for the encrypted content 124. This may include determining content rights for the encrypted content 124 from a first rights data file 116, and then performing an action on the content in compliance with the rights. For example, the DRM manager 112 determines whether the content rights include a right to transfer before transferring the content to another device. Each rights data file may include content rights, cryptographic key parameters, such as encryption/decryption methods, key types, key seeds, and a content ID. The content ID is a unique identifier of the content. Examples of the content rights include right to copy the content, right to transcode the content, right to play the content, right to move or transfer the content to a third party device, use on certain classed of devices, etc.

In one example, the DRM manager 112 utilizes a DRM system. DRM systems are known in the art and typically include software that imposes limitations on usage of the content determined, which may be set by the content provider, such as copying or content transfer limitations or other content limitations. The source device 110 thus contains hardware and/or software configured to decrypt the encrypted content 124 for playback and/or storage on the source device 110. For example, the encrypted content 124 may be protected by a DRM system in the service provider's head-end and delivered to the source device 110 in that encryption format. Thereafter, the source device 110 may perform all DRM operations without accessing an external license server. In a conventional DRM system, a device may be required to get approval or a license from an external license server each time a new class of action, such as a new copy or a transfer to a new device, is needed. According to an embodiment, the content rights for a broad class of DRM actions may be retrieved one time and stored in the source device so a connection to an external license server is not continually required. The source device may issue the derivative rights for transcoded content to other devices in the home network without going to an external license server.

The source device 110 may determine that the encrypted content 124 is to be transcoded to the encrypted content in the second encoding standard 127. For instance, the source device 110 may receive a request for the encrypted content encrypted in the second encoding standard from a PMD. Alternately, the source device 110 may be configured to automatically initiate a transcoding process from the encrypted content 124 to the encrypted content 127.

The source device 110 may create a decryption key for the encrypted content 124 using a pre-key (or content encryption key seed). For example, the pre-key is a cryptographic key that is input to a key derivation function for deriving the decryption key for the encrypted content 124. Alternatively, the decryption key may be received from an authorized device instead of derived using a pre-key. The DRM manager 112 creates a second rights data file 129. The second rights data file may be created based on domain and copy protection policies set forth by source device 110. The second rights data file 129 includes the decryption key for the encrypted content 124 or the decryption key is transferred separately. The DRM manager 112 sends the second rights data file 129 to the transcoding device 120, and then the transcoding device 120 may use the decryption key from the second rights data file 129 to decrypt the encrypted content 124. The decrypted content may then be transcoded by a transcoder 121 to the encrypted content 127, as further described below. Alternatively, the second rights data file 129 includes a pre-key for the encrypted 124 and the transcoding device 120 can derive content encryption key from it.

The second rights data file 129 may also include second content rights for the encrypted content 127 and a second content ID for the encrypted content 127. The second rights data file 129 may also include an encryption key or pre-key for encrypting the transcoded content to generate the encrypted content 127. The second content rights may be based on the content rights for the encrypted content 124 with modifications. For instance, the second content rights for the encrypted content 127 may include a decremented copy count, copy-no-more, etc. The first rights data file 116 and the second rights data file 129 may comprise a single content rights data file, and the single file may include different segments including the data for content rights for each of the encrypted content 124 and the encrypted content 127. Alternately the first rights data file 116 and the second rights data file 129 may comprise separate right data files. In that instance an external secure file linking the first rights data file and the second rights data file enforces DRM requirements. For example, the external secure file indicates a link between associated rights data files, so the content rights in the original file may not be violated. The link may then be used to determine changes in the content rights from the first rights data file that affect content rights from the second rights data file, such as a maximum number of copies or plays.

The second rights data file 129 may also include or identify a domain rights policy. The domain rights policy is a second layer of DRM protection that may include additional rights or restrictions specified by an administrator or other authorized person. The domain rights policy may be built into the devices. For instance, for a home network the source device 110 may have the domain rights policy. The domain rights policy may be a default policy set that can be updated/overwritten per customer or service provider. The transcoding device 120 includes a DRM manager 122, which receives the second rights data file 129 (the transfer being shown as 117). The DRM manager 122 also may include rights from the domain rights policy in second rights data file 129. One example of a content right is a class of PMDs are not allowed to copy but are allowed to play content.

The source device 110 may authenticate the transcoding device 120 before transmitting content to be encrypted to the transcoding device 120. For instance, the source device 110 may employ an authentication process to identify the transcoding device 120.

Described above is the second rights data file 129 transferred to the transcoding device 120 from the source device 110. The source device 110 also transfers the encrypted content 124 to the transcoding device 120. For instance, the source device 110 may copy the encrypted content 124 to the transcoding device 120. Alternately, the source device 110 may stream the encrypted content 124 to the transcoding device 120. Additionally, the source device 110 includes an instruction for the transcoding device 120 to send the encrypted content 127 to an indicated device. The indicated device may comprise, for instance, a PMD. Alternately, the source device 110 may indicate to the transcoding device 120 to send the transcoded content back to the source device 110. For instance, the source device 110 may store the encrypted content 127 in instances where there is no storage capability on the transcoding device 120.

Note that the transcoding device 120 may be a device that is separate from the source device 110 (e.g., provided in a separate housing) and is connected to the source device 110 through a port such as a Universal Serial Bus (USB), an Ethernet port, or another type of port or interface. For instance, according to an embodiment, the transcoding device 120 is connected to the source device 110 by a USB interface version 2.0. In another embodiment, the transcoding device 120 may be provided in the same housing as the source device 110.

The transcoding device 120 decrypts the encrypted content 124 using the decryption key in the second rights data file 129 to form content in the first encoding standard. The transcoder 121 then transcodes the content 124 into the second encoding standard, which is shown as the encrypted content 127. For instance, if the content is video, the transcoder 121 may decode the content in the first encoding standard 124 to form a baseband video signal. The transcoder 121 then encodes the baseband video signal to form the content in the second encoding standard 127. The transcoder 121 may transcode the content on a picture-by-picture basis or alternately a frame-by-frame basis. The transcoder 121 then encrypts the content in the second encoding standard using a second encryption key. The second encryption key may be provided by the DRM manager 112 of the source device 110, for example, in the second rights data file 129, or the second encryption key may be derived by the DRM manager 122 in the transcoding device 120 from a pre-key.

The transcoding device 120 includes a data storage 130 which stores the second rights data file 129, the encrypted content 124 and the encrypted content 127. The transcoding device 120 may transfer the encrypted content 127 to the source device 110 along with the second rights data file 129, including a decryption key for the encrypted content 127, based on the instruction received from the source device 110. The transcoding device 120 may also complete rights management. For instance, after the source device 110 verifies that the content rights for the encrypted content 127 allow a transfer to the PMD, the transcoding device 120 may transfer the encrypted content 127 to the PMD along with the decryption key.

The source device 110 may then complete rights management for the content by, for instance, keeping the encrypted content 124 and keeping the encrypted content 127 (e.g. copy-free). Alternately, the source device 110 may keep the encrypted content 124, and remove the encrypted content 127 (e.g. rights for one transcoded copy) and mark the encrypted content 124 as no-more-copy after transferring the encrypted content 127 to a PMD.

Alternately, the source device may remove the encrypted content 124, and remove the encrypted content 127 (e.g. copy-once/move). Still another alternative is that the source device 110 may remove the encrypted content 124, and keep the encrypted content 127 (e.g. only one resolution is allowed). All these policies may be determined by the source device 110 for the encrypted content 127 (i.e. the transcoded content).

Figure 2:
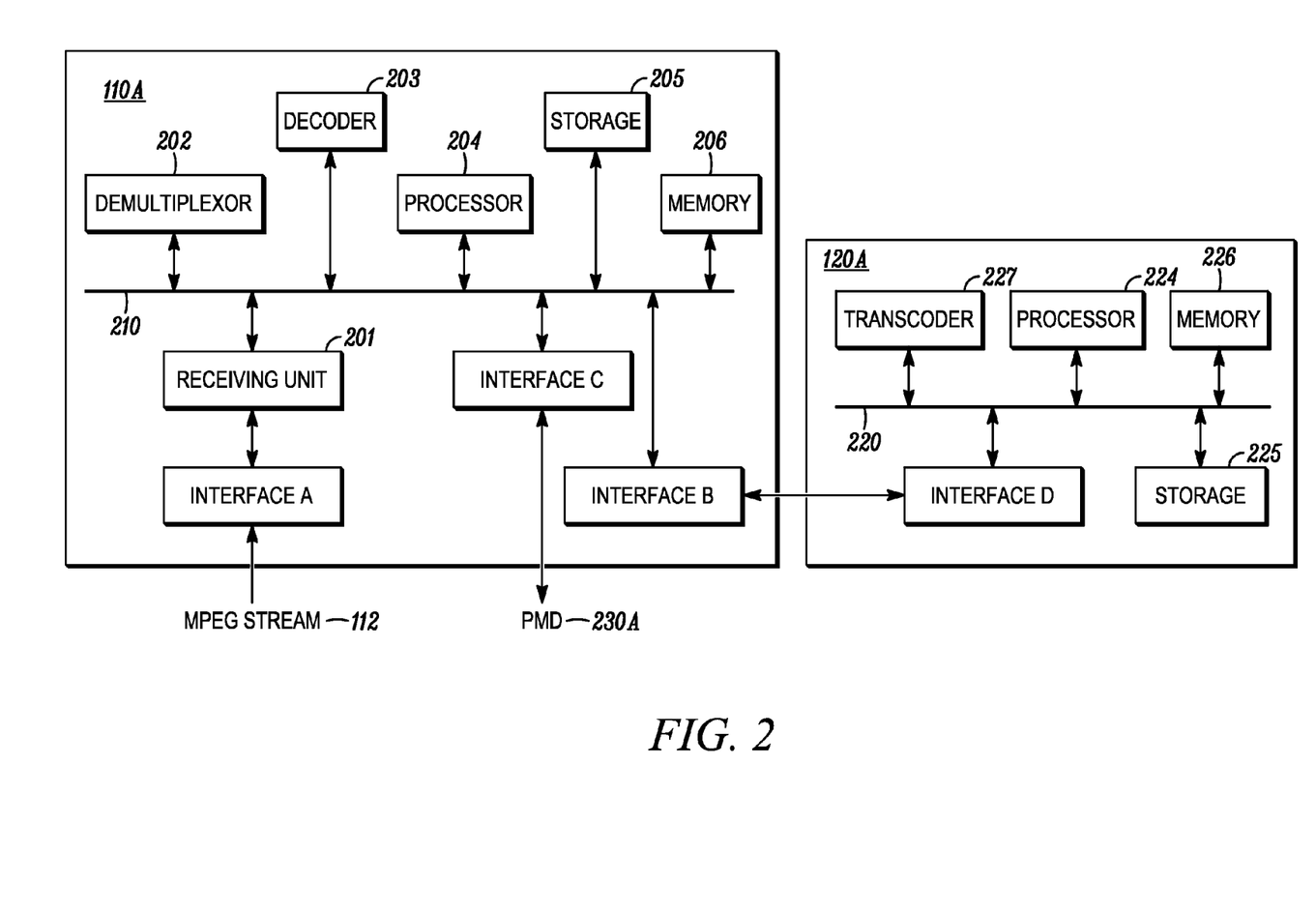
FIG. 2 shows a system that may be used for securely transcoding content from a first encoding standard to a second encoding standard, according to an embodiment.

FIG. 2 illustrates a block diagram of a set top box 110a and a transcoder 120a, according to an embodiment, both of which may be used to implement the system 100 of FIG. 1. In FIG. 2, the set top box 110a, for example, is the source device 110 of FIG. 1, and the transcoder 120a is the transcoder 120 of FIG. 1.

The set top box 110a may include interfaces A-C, receiving unit 201, demultiplexor 202, decoder 203, processor 204, storage 205, and memory 206 connected via system bus 210. It will be apparent to one of ordinary skill in the art the set top box 110a may include more or less components than shown, and the components shown are merely to illustrate basic functionality of the set top box 110a.

An MPEG stream 112 is received via an interface A. Other types of content may also be received via the interface A. The interface A may include a coaxial connection, a fiber optic connection, etc. The interface A may connect to a content provider via a network. The receiving unit 201 may include a tuner/demodulator demodulating the received MPEG stream 112. A demultiplexor 202 demultiplexes the received MPEG stream 112 to produce one or more single program streams.

If the input stream, i.e. the single program stream, contains protected content that is to be transcoded, the processor 204 sends the stream to the transcoding device 110 via interface B. The input stream may comprise encrypted content, for example as the encrypted content 124 described hereinabove with respect to FIG. 1. Interface B may include a USB interface, Ethernet interface, etc. If the input stream, for instance the encrypted content 124 as described hereinabove with respect to FIG. 1, is an MPEG stream that is decodable by the decoder 203, the processor 204 sends the input stream to the decoder 203. If the input content is to be transcoded, the processor 204 sends the input content to the transcoding device 120a. The processor 204 may perform as a DRM manager, for example as an executable software implementation of the DRM manager 112 as described with respect to FIG.1 hereinabove. Accordingly, the processor 204 may perform key management operations and manage rights data files for encrypted content on the set top box 110a.

The data storage 205 may include a DVR hard drive or other non-volatile data storage storing video and/or other data. The memory 206 may include RAM. The data storage 205 and memory 206 are examples of computer readable storage devices that may store computer code executed by the processor 204 to perform various functions described herein. The encrypted content 124 may be stored in the data storage 205. This may include programs from the MPEG stream 112.

The transcoding device 120a includes interface D, processor 224, data storage 225, memory 226, transcoder 227, and bus 220. It will be apparent to one of ordinary skill in the art that the transcoding device 120a may include more or less components than shown, and the components shown are merely to illustrate basic functionality of the transcoding device 120a.

The protected content is received from the set top box 110a via interface D, which may include a USB interface, Ethernet interface, etc. The processor 224 sends the protected content to the transcoder 227 and also sends coding parameters for transcoding the protected content into a second encoding standard. The coding parameters may indicate a level of quality, a resolution (e.g., 720P, 1080P, etc.), and other parameters that describe the single layer encoded video stream to be generated by the transcoder 227. The transcoder 227 generates content in the encoding standard specified by the coding parameters. This may include converting the protected content, for example, from MPEG-2 to MPEG-4 AVC.

The processor 204 in the set top box 110a may send a control signal identifying the coding parameters to the processor 224 in the transcoding device 120a, or the coding parameters may have been previously stored in the transcoding device 120a. The coding parameters may reflect the type of stream that the decoder 203 in the set top box 110a has the capability to decode. In addition, the coding parameters may be modified to generate video of different qualities, resolutions, etc.

The encrypted content 127 generated by the transcoder 227 is sent to the set top box 110a via the interface D. The storage 205 in the set top box 110a stores the encrypted content 127, which may then be sent to a PMD 230a via interface C. Interface C may comprise USB, Ethernet, WiFi or similar interface. The set top box 110a may complete rights management by direct communication with the PMD 230a.

The data storage 225 may include non-volatile data storage, and the memory 226 may include RAM or some other type of storage. The data storage 225 and memory 226 are examples of computer readable storage devices that may store computer code executed by the processor 224 to perform various functions described herein.

Figure 3:
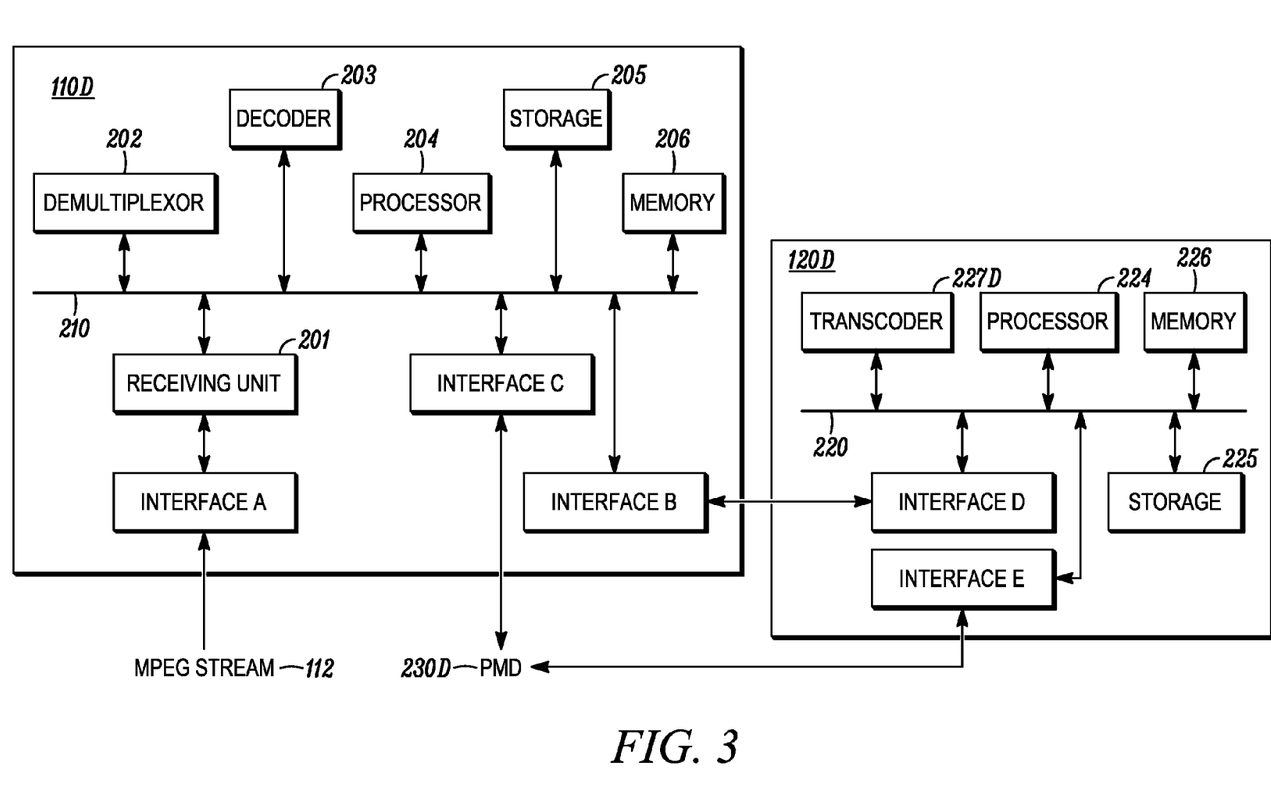
FIG. 3 shows a system that may be used for securely transcoding content from a first encoding standard to a second encoding standard, according to an embodiment.

FIG. 3 illustrates a block diagram of a source device and a transcoding device, according to another embodiment, both of which may be used to implement the system 100 in FIG. 1. This embodiment is similar to the embodiment shown in FIG. 2, except the transcoding device 120d transfers the encrypted content 127 to the PMD 230d. The protected content is received from the set top box 110a via the interface B, the same as discussed with respect to FIG. 2. However, instead of sending the encrypted content 127 to the set top box 110a, the encrypted content 127 is sent to the PMD 230a via an interface E.

The transcoding device 120a and the transcoding device 120d may be portable devices that are external to the set top box 110a but connectable via the interface B. For example, the transcoding device 120a may be a device having its own housing that is external and separate from a housing of the set top box 110a. Thus, these devices may be easily distributed to the subscribers and the subscribers can connect the devices to their source devices without requiring a technician to be dispatched to the subscribers' premises. The set top box 110a may complete rights management by direct communication with the PMD 230a or alternately, through the transcoding device 120d.

Examples of method in which the system 100 may be employed for transcoding encrypted content in a first encoding standard to encrypted content in a second encoding standard now be described with respect to the following flow diagram of the methods 300 and 400 depicted in FIGS. 4 and 5. It should be apparent to those of ordinary skill in the art that the methods 300 and 400 represent generalized illustrations and that other steps may be added or existing steps may be removed, modified or rearranged without departing from the scopes of the methods 300 and 400. In addition, the methods 300 and 400 are described with respect to the system 100 by way of example and not limitation, and the methods 300 and 400 may be used in other systems.

Some or all of the operations set forth in the methods 300 and 400 may be contained as one or more computer programs stored in any desired computer readable medium and executed by a processor on a computer system as described with respect to FIGS. 1-3. Exemplary computer readable media that may be used to store software operable to implement the present invention include but are not limited to conventional computer system RAM, ROM, EPROM, EEPROM, hard disks, or other data storage devices.

Figure 4:
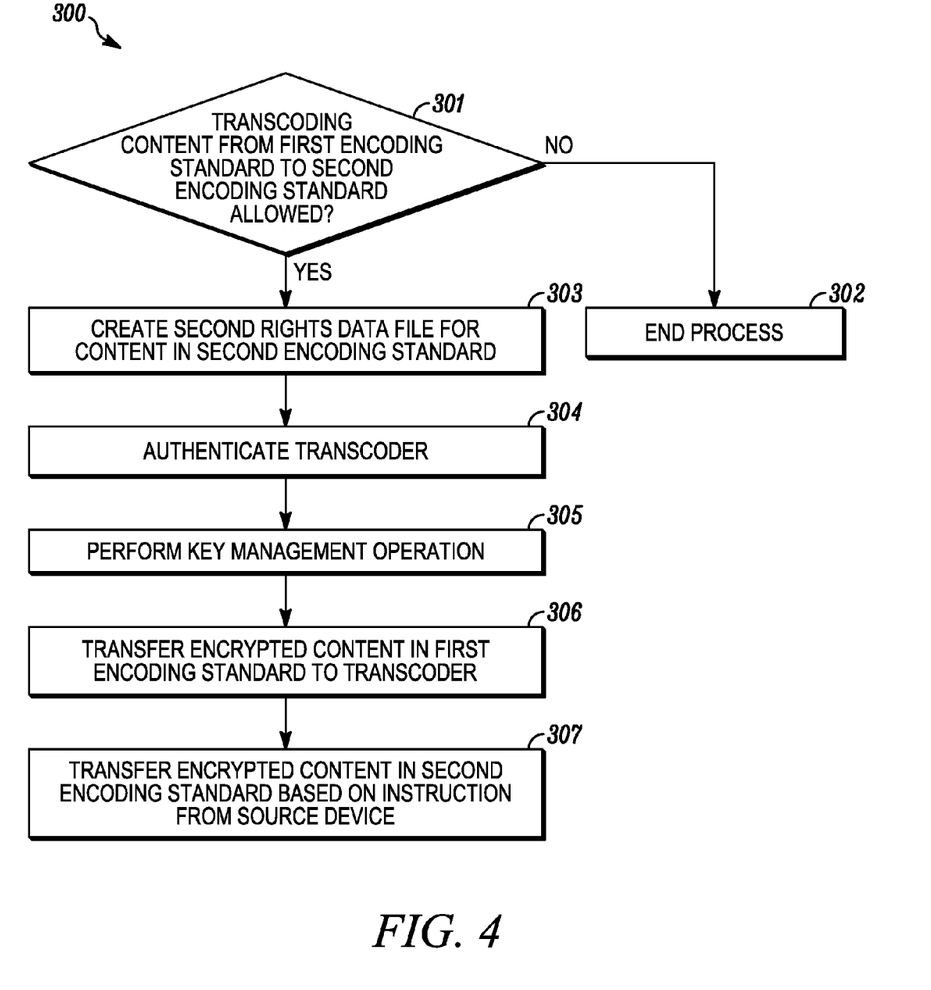
FIG. 4 illustrates a flow diagram of a method of securely transcoding content from a first encoding standard to a second encoding standard, according to an embodiment.

At step 301, as shown in FIG. 4, the source device 110 determines content rights 113 for the encrypted content 124 using a first rights data file. The first rights data file includes a first content ID, a first encryption key, and indicates the content rights including whether transcoding of the encrypted content 124 to encrypted content 127 is allowed. The first rights data file may also include a decryption key for the encrypted content 124. If the content rights indicate that transcoding of the encrypted content 124 to the encrypted content 127 is not allowed, the source device 110 ends the process at step 302.

At step 303, if the content rights indicate that transcoding of the encrypted content 124 to encrypted content 127 is allowed, the source device 110 creates a second rights data file for transcoded content in the second encoding standard. The second rights data file includes a second content ID, and a second encryption key. The second encryption key may be derived using the second encoding standard.

At step 304, the source device 110 authenticates the transcoding device 120. For instance, the source device 110 may employ a security token to identify the transcoding device 120.

At step 305, the source device 110 performs a key management operation. The key management operation includes communicating the decryption key for the encrypted content 124 and the second encryption key for the encrypted content 127 to the transcoder.

At step 306, the source device 110 transfers the encrypted content 124 to the transcoding device 120. The transcoding device 120 is configured to thereafter decrypt the encrypted content 124 using the decryption key. The transcoding device 120 then transcodes the content in the first encoding standard to the content in the second encoding standard, and re-encrypts the content in the second encoding standard to form encrypted content 127 using the second encryption key. The content rights of the encrypted content 124 may differ from the second content rights of the encrypted content in the second encoding standard 124. The transcoding device 120 then transfers the encrypted content 127 to an indicated device.

At step 307, the encrypted content 127 is transferred by the transcoding device 120 according to an instruction received from the source device 110. For instance, the source device 110 may receive the encrypted content 127 from the transcoding device 120. The transcoding device 120 may store the encrypted content 127 locally if it has storage capability. Alternately, the source device 110 may instruct the transcoding device 120 to send the encrypted content 127 to a PMD. The source device 110 may thereafter complete rights management.

Figure 5:
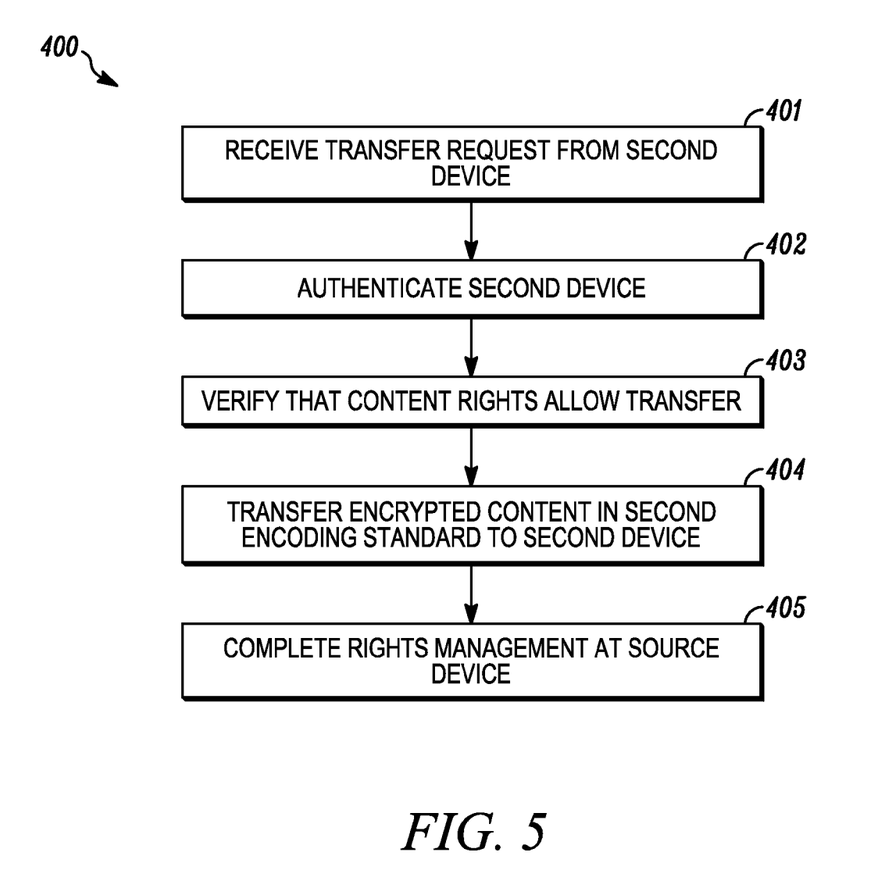
FIG. 5 illustrates a flow diagram of a method of securely transferring content from a source device to a second device, according to an embodiment.

Turning now to FIG. 5, there is shown a flow diagram of a method 400 for securely transferring the encrypted content 127 to a second device, according to another embodiment.

At step 401, the source device 110 receives a transfer request from a second device, for instance a PMD, for the encrypted content 127. For instance, a user in a home network may request content on the source device 110 using the second device.

At step 402, the source device 110 authenticates the second device. For instance, the source device 110 may receive a security token indicating that the second device is authorized to receive content on the home network.

At step 403, the source device 110 verifies whether the content rights for the encrypted content 127 allow the transfer. For instance, the source device 110 may access the second rights data file to determine whether the content rights allow the transfer.

At step 404, the source device 110 transfers the decryption key and the encrypted content 127 to the second device.

At step 405, the source device 110 complete rights management for the content. For instance, the source device 110 may either keep the encrypted content 124 or remove the encrypted content 124. The source device 110 may also either keep the encrypted content 127 or remove the encrypted content 124. The source device 110 may also maintain binding of content rights (i.e. CCI) to the second encryption key after transcoding of the encrypted content in the first encoding standard to the encrypted content in the second encoding standard. For example, the content rights associated with the encrypted content 127 may remain associated with the second encryption key. For subsequent usage of the second encryption key the DRM rules are enforced using the content rights previously bound to the second encryption key.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A source device having encrypted content in a first encoding standard, the source device comprising:
   a data storage configured to store a first rights data file, wherein the first rights data file includes a first content ID, and a first encryption key, and indicates content rights including whether transcoding of the encrypted content in the first encoding standard to encrypted content in a second encoding standard is allowed;
   a processor configured to
      determine the content rights for the encrypted content in the first encoding standard using the first rights data file;
      in response to determining the transcoding of the encrypted content into the second encoding standard is allowed, create a second rights data file for transcoded content in the second encoding standard, wherein the second rights data file includes a second content ID, and a second encryption key, and indicates second content rights;
      perform a key management operation including communicating a decryption key for the encrypted content in the first encoding standard and the second encryption key for the encrypted content in the second encoding standard to a transcoder; and
      transfer the encrypted content in the first encoding standard to the transcoder.

2. The source device of claim 1, wherein the source device is further configured to:
   receive a transfer request from a second device for the encrypted content in the second encoding standard;
   authenticate the second device;
   verify whether the content rights for the encrypted content in the first encoding standard allow the transfer request; and
   transfer the decryption key and the encrypted content in the second encoding standard to the second device.

3. The source device of claim 2, wherein the source device is further configured to
   remove or keep the encrypted content in the first encoding standard and remove or keep the encrypted content in the second encoding standard.

4. The source device of claim 1, wherein the source device is further configured to authenticate the transcoder.

5. The source device of claim 1, wherein the first rights data file and the second rights data file comprise a single content rights data file having two segments, wherein one segment includes content rights for the encrypted content in the first encoding standard and another segment includes content rights for the encrypted content in the second encoding standard.

6. The source device of claim 1, wherein the first rights data file and the second rights data file comprise separate data files; and
 an external secure file links the first rights data file and the second rights data file and is used to enforce the content rights of each of the encrypted content in the first encoding standard and the second encoding standard.

7. The source device of claim 1, wherein the second content rights in the second rights data file are created based on the content rights in the first rights data file.

8. The source device of claim 1, wherein the second encoding standard is used to derive the second encryption key from the second encryption pre-key.

9. The source device of claim 1, and further including a transcoder configured to maintain a binding of content rights data to the second encryption key after transcoding of the encrypted content in the first encoding standard to the encrypted content in the second encoding standard.

10. The source device of claim 1, wherein the content rights of the encrypted content in the first encoding standard differs from the second content rights of the encrypted content in the second encoding standard.

11. The source device of claim 1, wherein the content rights for the encrypted content in the first encoding standard comprises a first layer of digital rights management (DRM) protection and a second layer of DRM protection is provided by domain rights policy determined by an administrator.

12. The source device of claim 1, wherein the source device is a set top box.

13. A transcoding device for transcoding content from a first encoding standard to a second encoding standard, the transcoding device comprising:
 an interface coupled to a source device; and
 a transcoder receiving the encrypted content in the first encoding standard via the interface from the source device, receiving a decryption key via the interface from the source device, and receiving a second rights data file including a second content ID, and a second encryption key via the interface from the source device, and
 the transcoder decrypting the encrypted content in the first encoding standard using the decryption key received from the source device, transcoding the content in the first encoding standard to the content in the second encoding standard, re-encrypting the content in the second encoding standard to form encrypted content in the second encoding standard using the second encryption key, and transferring the encrypted content in the second encoding standard to at least one of the source device and a second device indicated by the source device.

14. A method for transcoding encrypted content:
 at a source device, determining content rights for encrypted content in a first encoding standard using a first rights data file, wherein the first rights data file includes a first content ID, and a first encryption key, and indicates whether transcoding of the encrypted content in the first encoding standard to encrypted content in a second encoding standard is allowed;
 creating a second rights data file for transcoded content in the second encoding standard, wherein the second rights data file includes a second content ID, and a second encryption key, the second encryption key being derived from a second encryption pre-key, in response to a determination that transcoding of the encrypted content in the first encoding standard to encrypted content in the second encoding standard is allowed;
 authenticating a transcoder;
 performing a key management operation including communicating a decryption key for the encrypted content in the first encoding standard and an encryption key for the encrypted content in the second encoding standard to the transcoder; and
 transferring the encrypted content in the first encoding standard to the transcoder;
 and decrypting the encrypted content in the first encoding standard using the decryption key, transcoding the encrypted content into the second encoding standard, re-encrypting the transcoded content in the second encoding standard to form encrypted content in the second encoding standard using the encryption key, and transferring the encrypted content in the second encoding standard to at least one of the source device and a second device indicated by the source device.

15. The method of claim 14, further comprising:
 receiving a transfer request from a second device for the encrypted content in the second encoding standard;
 verifying whether the content rights for the encrypted content in the first encoding standard allow the transfer request; and
 transferring the decryption key and the encrypted content in the second encoding standard to the second device.

16. The method of claim 15, further comprising:
 removing or keeping the encrypted content in the first encoding standard; and
 removing or keeping the encrypted content in the second encoding standard.

17. The method of claim 14, further comprising:
 providing a second layer of DRM protection using a domain rights policy determined by an administrator, the content rights for the encrypted content in the first encoding standard comprising a first layer of DRM protection.

18. A non-transitory computer readable storage medium storing at least one computer program that when executed performs a method for securely transcoding encrypted content, the method comprising:
 at a source device, determining content rights for encrypted content in a first encoding standard using a first rights data file, wherein the first rights data file includes a first content ID, and a first encryption key, and indicates whether transcoding of the encrypted content in the first encoding standard to encrypted content in a second encoding standard is allowed;
 creating a second rights data file for transcoded content in the second encoding standard, wherein the second rights data file includes a second content ID, and a second encryption key, the second encryption key being derived from a second encryption pre-key, in response to a determination that transcoding of the encrypted content in the first encoding standard to encrypted content in the second encoding standard is allowed;
 authenticating a transcoder;
 performing a key management operation including communicating a decryption key for the encrypted content in the first encoding standard and an encryption key for the encrypted content in the second encoding standard to the transcoder; and
 transferring the encrypted content in the first encoding standard to the transcoder.

19. The method stored on the computer readable storage medium of claim 18, further comprising:
receiving a transfer request from a second device for the encrypted content in the second encoding standard;
authenticating the second device;
verifying whether the content rights for the encrypted content in the first encoding standard allow the transfer request; and
transferring the decryption key and the encrypted content in the second encoding standard to the second device.

20. The method stored on the computer readable storage medium of claim 18, further comprising:
removing or keeping the encrypted content in the first encoding standard; and
removing or keeping the encrypted content in the second encoding standard.

21. The source device of claim 1 and further including a transcoder to re-encrypt the transcoded content in the second encoding standard using the second encryption key from the second rights data file.

22. The method of claim 14 wherein re-encrypting the transcoded content in the second encoding standard using the encryption key includes using the second encryption key from the second rights data file.

23. The method stored on the computer readable storage medium of claim 18 and further including re-encrypting the transcoded content in the second encoding standard using the encryption key from the second rights data file.

* * * * *